(12) United States Patent
Lee

(10) Patent No.: US 11,486,423 B2
(45) Date of Patent: Nov. 1, 2022

(54) LINEAR LATCHING SYSTEMS AND METHODS

(71) Applicant: ILLINOIS TOOL WORKS INC., Glenview, IL (US)

(72) Inventor: Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 867 days.

(21) Appl. No.: 16/216,295

(22) Filed: Dec. 11, 2018

(65) Prior Publication Data
US 2019/0195253 A1    Jun. 27, 2019

Related U.S. Application Data

(60) Provisional application No. 62/608,596, filed on Dec. 21, 2017.

(51) Int. Cl.
| | |
|---|---|
| *F16M 11/00* | (2006.01) |
| *F16B 2/22* | (2006.01) |
| *B60N 3/10* | (2006.01) |
| *F16B 5/06* | (2006.01) |
| *F16B 5/07* | (2006.01) |
| *B62D 29/04* | (2006.01) |

(52) U.S. Cl.
CPC ............... *F16B 2/22* (2013.01); *B60N 3/101* (2013.01); *B62D 29/048* (2013.01); *F16B 5/0628* (2013.01); *F16B 5/0657* (2013.01); *F16B 5/07* (2013.01); *F16B 2200/10* (2018.08)

(58) Field of Classification Search
CPC ........ F16B 2/22; F16B 5/0628; F16B 5/0657; F16B 5/07; B60N 3/101; B62D 29/048
See application file for complete search history.

(56) References Cited

U.S. PATENT DOCUMENTS

| | | | |
|---|---|---|---|
| 4,250,599 A * | 2/1981 | Nagashima | F16B 5/0628 24/326 |
| 6,267,217 B1 | 7/2001 | Malone et al. | |
| 7,578,554 B2 | 8/2009 | Lee et al. | |
| 7,784,755 B1 * | 8/2010 | Johnson | E04B 9/006 248/220.21 |

(Continued)

FOREIGN PATENT DOCUMENTS

| | | |
|---|---|---|
| FR | 2789130 A1 | 8/2000 |
| GB | 2281260 A | 3/1995 |

OTHER PUBLICATIONS

Extended European Search Report received from corresponding European Patent Application No. 18214171.3, dated May 23, 2019 (8 pages).

*Primary Examiner* — Amy J. Sterling
(74) *Attorney, Agent, or Firm* — Quarles & Brady LLP

(57) ABSTRACT

A latching assembly includes a linear component and a base component. The linear component is configured to be coupled to a first element and includes at least one retention projection. The base component is configured to be coupled to a second element and includes a channel and at least one retention feature. The linear component is configured to be slidably received within the channel of the base component and the at least one retention feature of the base component is configured to engage the at least one retention projection of the linear component to retain the linear component within the channel of the base component.

16 Claims, 14 Drawing Sheets

(56) References Cited

U.S. PATENT DOCUMENTS

| | | |
|---|---|---|
| 7,992,915 B2 | 8/2011 | Kwolek |
| 8,701,819 B2 | 4/2014 | Porcs |
| 9,532,474 B2 * | 12/2016 | Gutschenritter ....... F16M 13/04 |
| 9,752,608 B2 | 9/2017 | Winklbauer |
| 11,078,944 B2 * | 8/2021 | Lepper .................. F16B 21/073 |
| 2008/0209698 A1 | 9/2008 | Colorado |
| 2009/0188086 A1 * | 7/2009 | Okada ................. B60R 13/0206 24/297 |
| 2016/0053478 A1 * | 2/2016 | Porter ................... F16B 5/0642 248/222.12 |
| 2016/0129854 A1 | 5/2016 | Bachelder et al. |

* cited by examiner

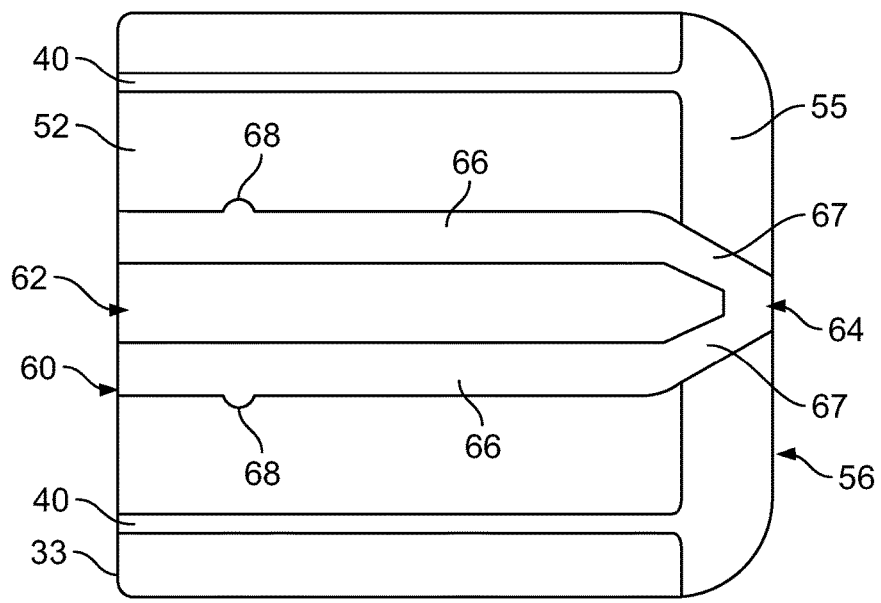
FIG. 7
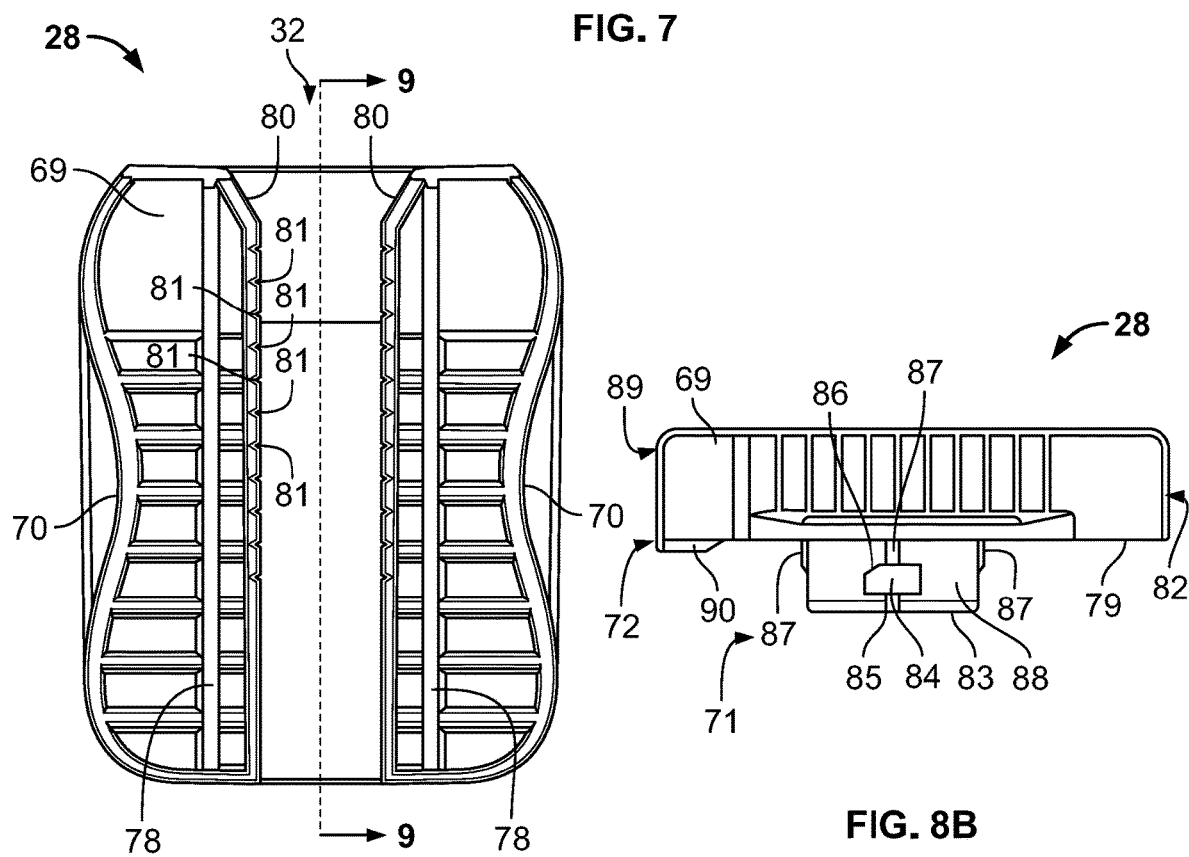
FIG. 8A
FIG. 8B

FIG. 19A  FIG. 19B

LINEAR LATCHING SYSTEMS AND METHODS

CROSS-REFERENCE TO RELATED APPLICATIONS

The present application is based on, claims priority to, and incorporates in its entirety U.S. Provisional Application No. 62/608,596, filed on Dec. 21, 2017, and entitled "Linear Latching Systems and Methods."

FIELD OF THE INVENTION

The present invention relates to latching systems and methods and, more particularly, to latching systems and methods that are configured to securely couple two components together.

BACKGROUND

In the automotive industry, fasteners are frequently used to securely couple various components together. In some instances, metal fasteners such as screws, bolts, and/or the like are often used to securely connect components of a vehicle together. For example, a console within an internal cabin of a vehicle may be secured to another component within the internal cabin through multiple metal fasteners. Typically, one or more tools are used to secure the console to the other component.

Certain known mounting systems are relatively heavy and include portions which may be formed through complex operations, such as stamping, rolling, welding, and/or the like. Due, in part, to the complex forming operations, the mounting systems may be expensive. Further, the process of coupling components to the known mounting systems may be complex and time consuming. Moreover, the known mounting systems include exposed metal fasteners that are readily visible, which may not be aesthetically desirable. As such, additional structures may be used to conceal the exposed fasteners, thereby adding time and cost to an installation process.

Therefore, there is a continued need for a mounting system that is lighter than certain known mounting systems. Further, a need exists for a mounting system that may be quickly, easily, and efficiently manufactured. Also, a need exists for a cost-effective mounting system. Additionally, a need exists for a mounting system that may be used to quickly, efficiently, and effectively secure to one or more components. Also, a need exists for a mounting system that is devoid of exposed fasteners.

SUMMARY

In one aspect, a latching assembly configured to couple a first element to a second element is provided. The latching assembly comprises a linear component and a base component. The linear component is configured to be coupled to a first element. The linear component includes at least one retention projection. The base component is configured to be coupled to a second element. The base component includes a channel and at least one retention feature. The linear component is configured to be slidably received within the channel of the base component and the at least one retention feature of the base component is configured to engage the at least one retention projection of the linear component to retain the linear component within the channel of the base component.

In another aspect, a latching assembly configured to couple a first element to a second element is provided. The latching assembly comprises a linear component and a base component. The linear component is configured to be coupled to the first element. The base component is configured to be coupled to the second element. The base component includes a channel. The linear component is configured to be slidably received and retained within the channel of the base component.

Other features and advantages of the invention will become apparent to those skilled in the art upon review of the following detailed description, claims and drawings in which like numerals are used to designate like features.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

FIG. 7 is a cross-sectional view of the linear component of FIG. 6B, taken along line 7-7;

FIG. 8A is a top plan view of the base component of FIG. 4;

FIG. 8B is a side elevational view of the base component of FIG. 4;

FIG. 19A is a bottom plan view of a linear component of the latching assembly of FIG. 18;

FIG. 19B is a side elevational view of the linear component of the latching assembly of FIG. 18;

DETAILED DESCRIPTION

Aspects of the present disclosure provide latching assemblies for coupling various elements without the need for separate fasteners, adhesives, or other external or separate coupling elements or tooling. The lack of separate fasteners, adhesives, or other external or separate coupling elements or tooling may allow for a reduced overall weight and a reduced assembly time of the various latching assemblies. It may be appreciated that, although the provided examples below describe using the disclosed latching systems to couple various elements within an automotive interior, the disclosed latching systems may be used in other manners, as desired, depending on a given application.

Figure 1:
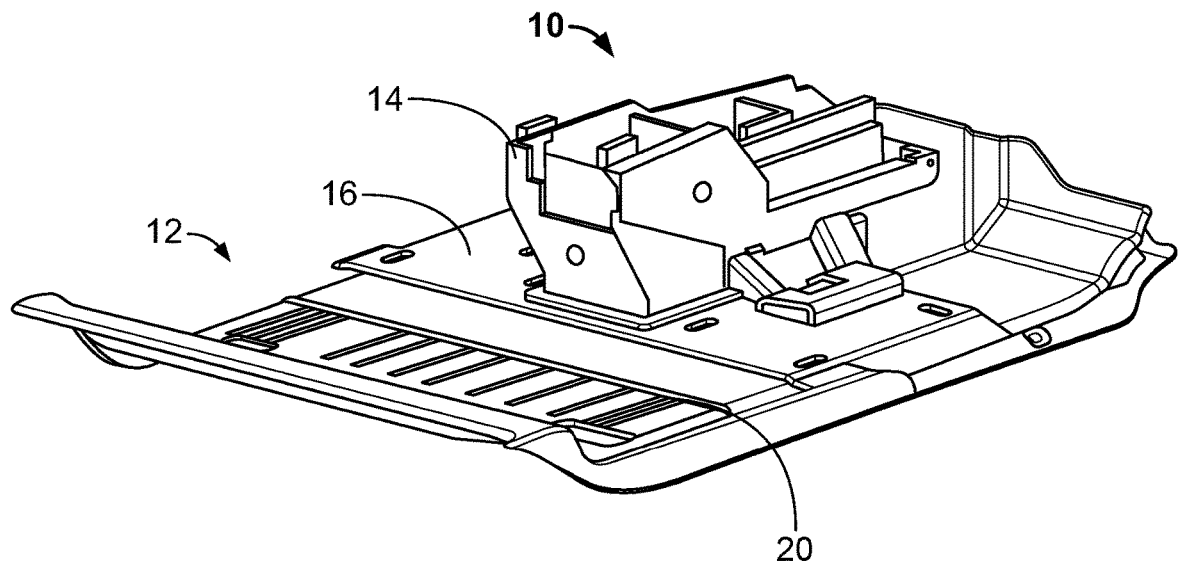
FIG. 1 is a perspective view of a first element secured to a second element, in accordance with aspects of the present disclosure.
Figure 2:
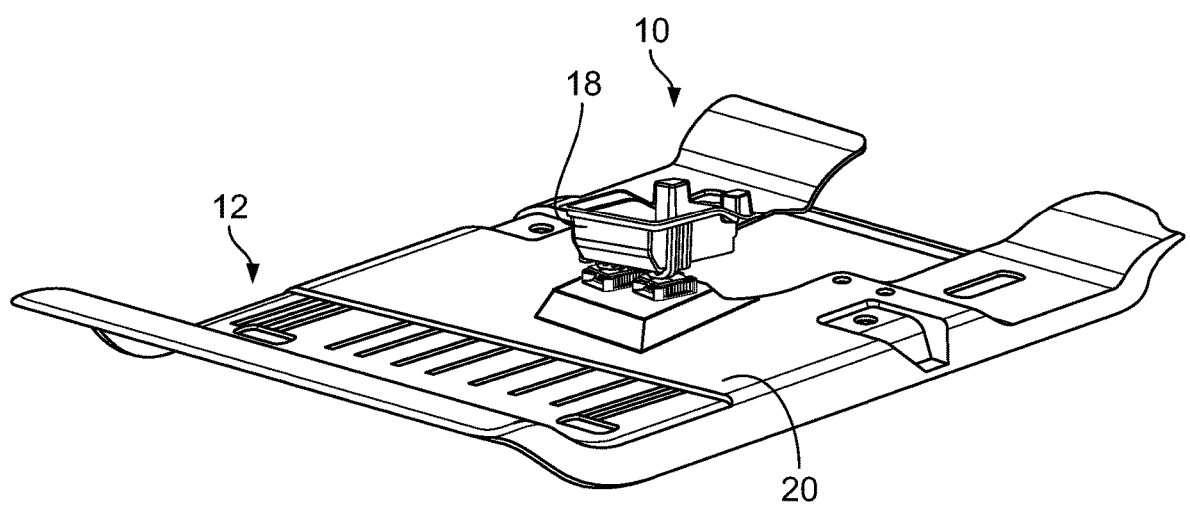
FIG. 2 is a perspective view similar to that of FIG. 1, where a portion of the first element is secured to the second element.

Referring now to FIGS. 1 and 2, a first element 10 of an automotive interior is coupled to a second element 12 of an automotive interior using one or more latching systems, as described herein. In some instances, the first element 10 may include a console 14, a floor portion 16, and a connection portion 18 (shown in FIG. 2). The floor portion 16 may be configured to conform to the second element 12 when the first element 10 is coupled to the second element 12. The connection portion 18 may be configured to engage one of the various latching assemblies described herein to couple the first element 10 to the second element 12, as will be described below. In some instances, the second element 12 may be a vehicle body floor 20.

Figure 3:
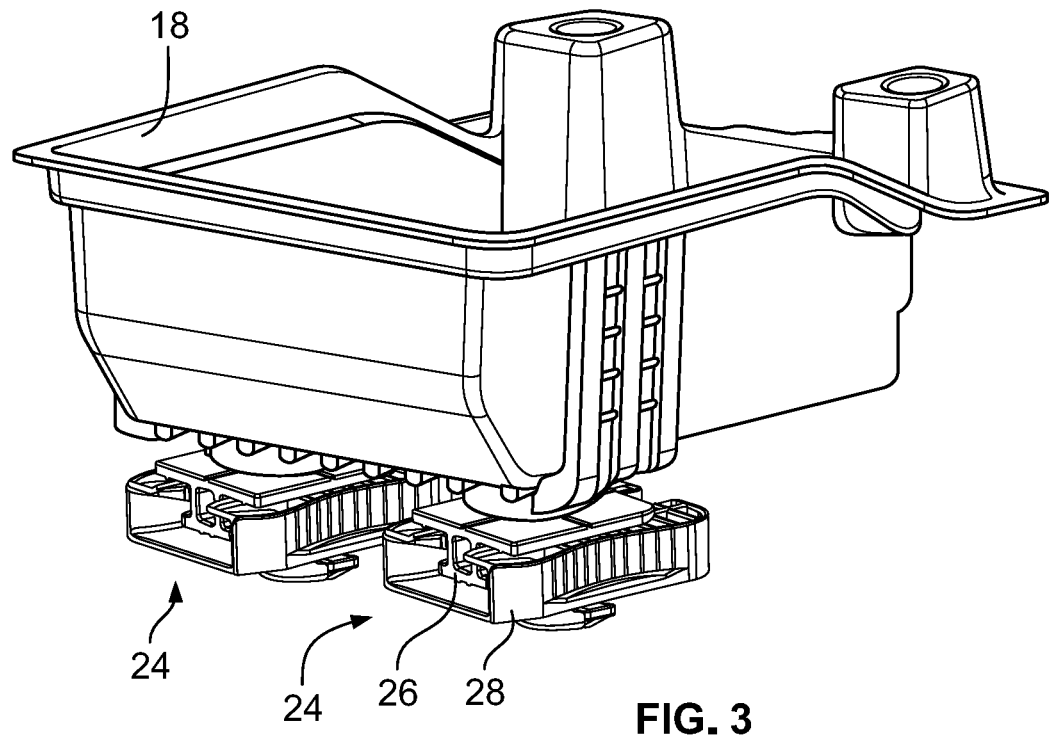
FIG. 3 is a perspective view of a latching assembly secured to the portion of the first element shown in FIG. 2, in accordance with aspects of the present disclosure.

Referring now to FIG. 3, the connection portion 18 of the first element 10 is configured to be selectively coupled to the second element 12 using latching assemblies 24. In some instances, the connection portion 18 of the first element 10 may be selectively coupled to a linear component 26 of each latching assembly 24, and the second element 12 may be selectively coupled to a base component 28 of each latching assembly 24.

Figure 4:
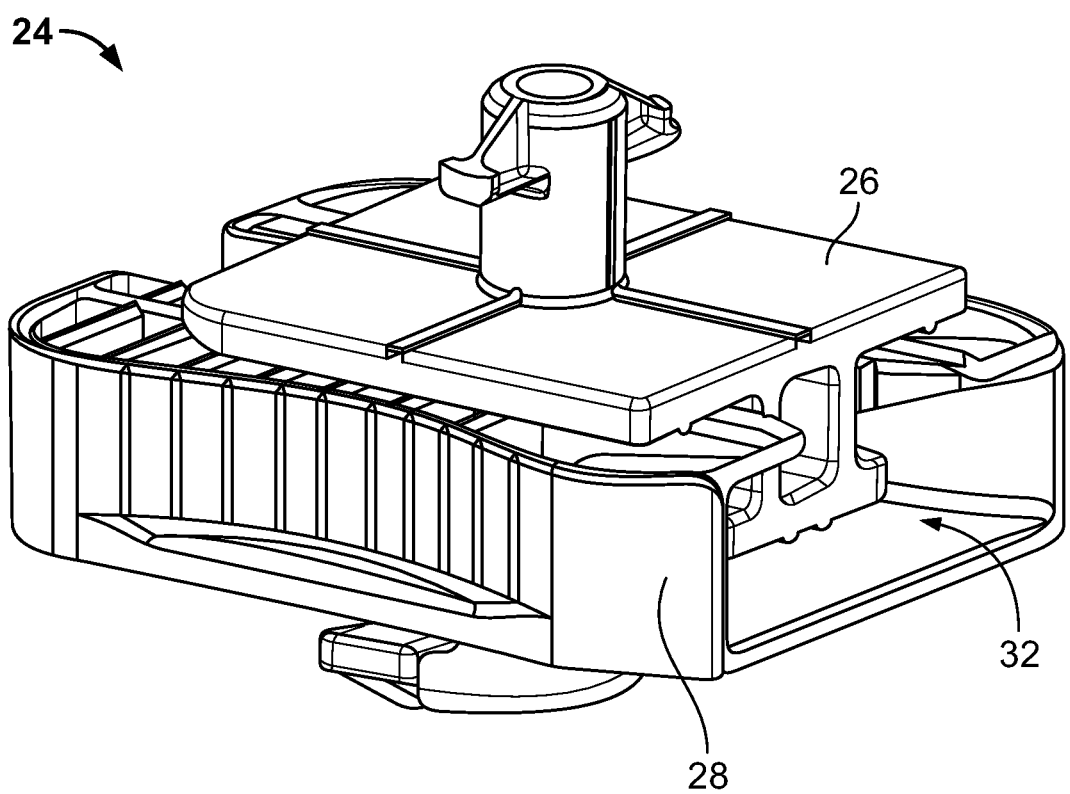
FIG. 4 is a perspective view of the latching assembly of FIG. 3 including a linear component engaged with a base component, in accordance with aspects of the present disclosure.
Figure 5:
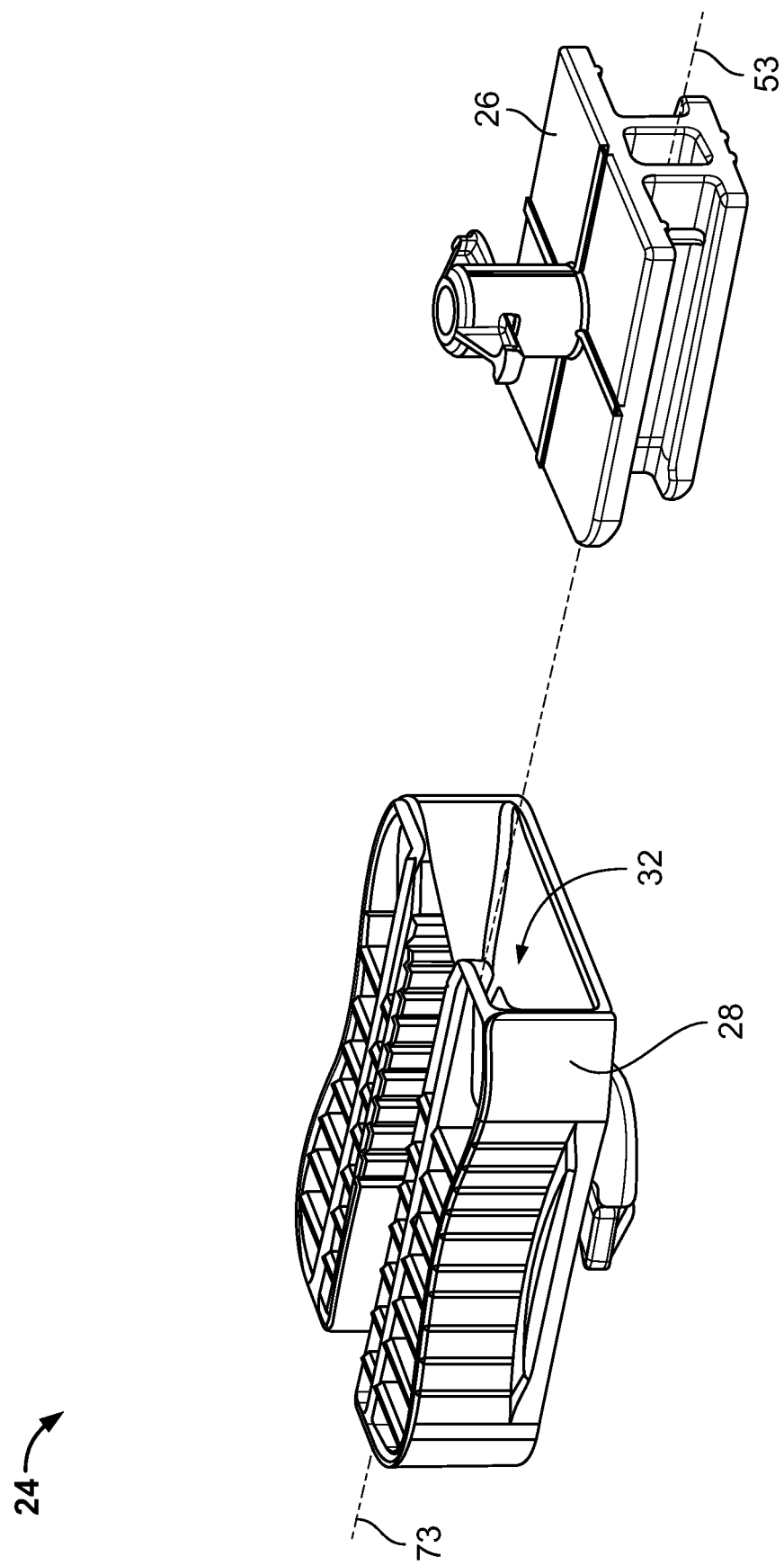
FIG. 5 is a perspective view of the latching assembly of FIG. 4, shown with the linear component disengaged from the base component.

With reference to FIGS. 4 and 5, one of the latching assemblies 24 is illustrated in an engaged or coupled position (FIG. 4) and a disengaged or decoupled position (FIG. 5). In the engaged position, the linear component 26 is configured to be received within the base component 28. Specifically, the linear component 26 is configured to be slidably received and retained within a channel 32 formed in the base component 28.

Figure 6A:
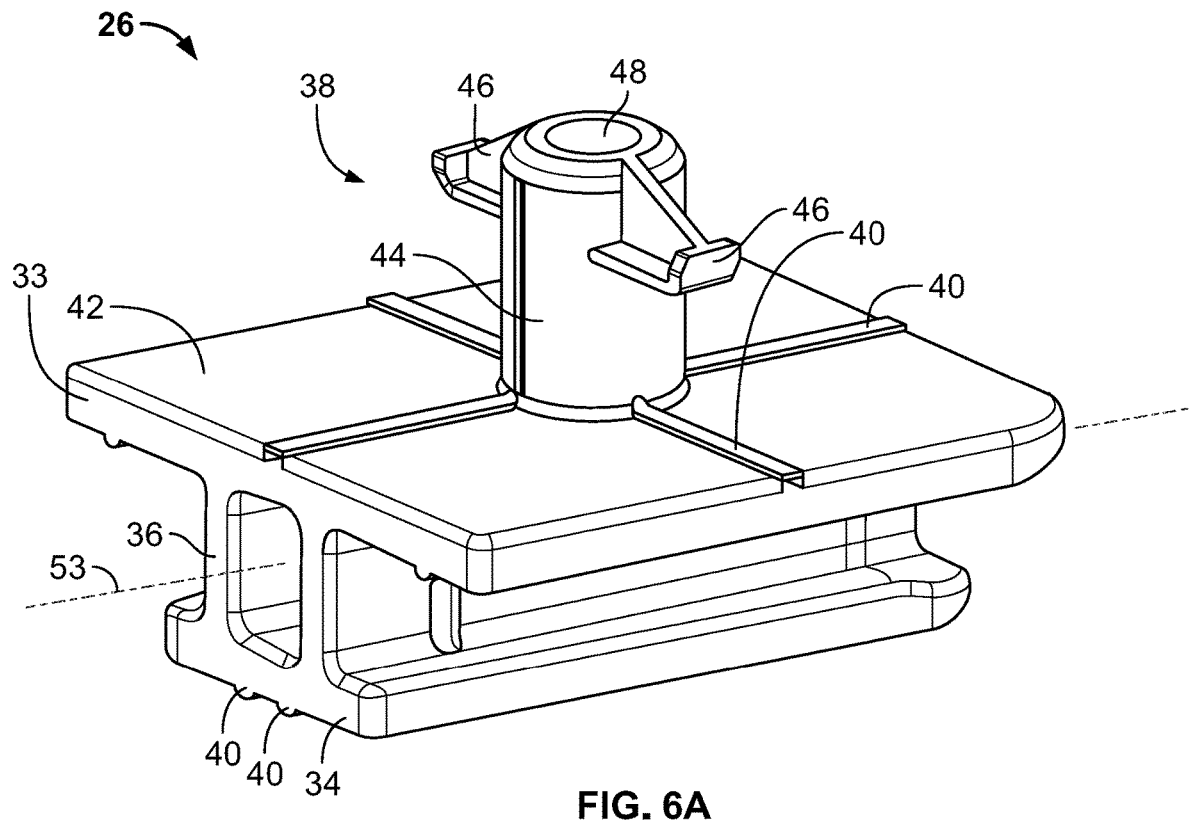
FIG. 6A is a perspective view of the linear component of the latching assembly of FIG. 4.
Figure 6B:
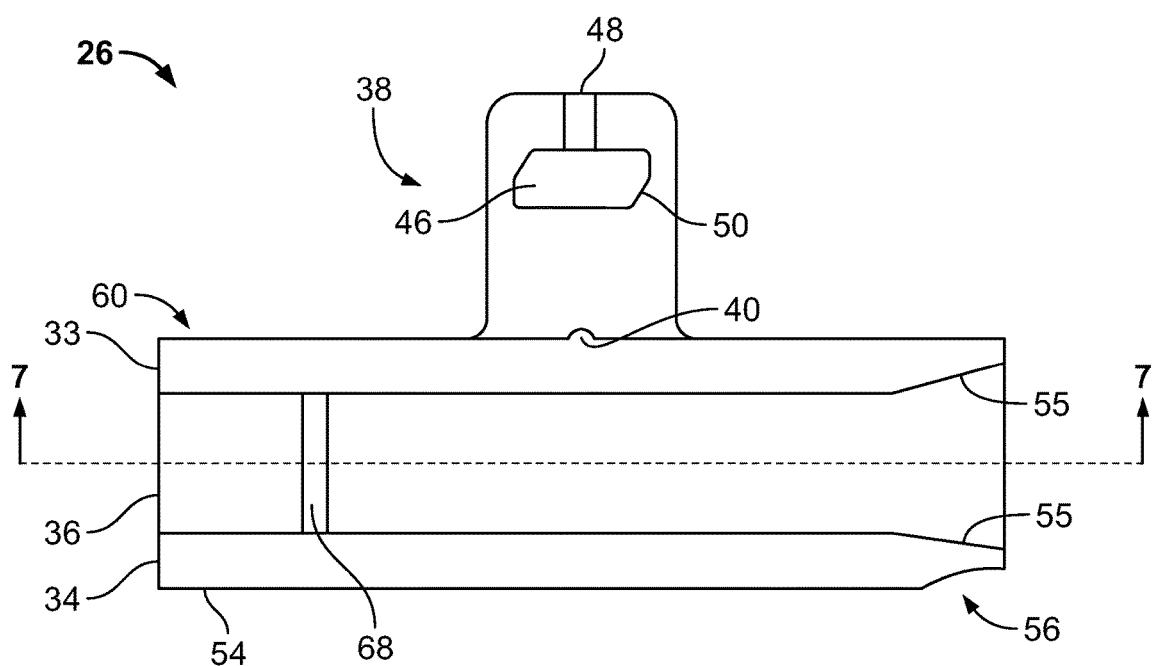
FIG. 6B is a side elevational view of the linear component of FIG. 4.

Referring now to FIGS. 6A and 6B, the linear component 26 includes an upper segment 33 connected to a lower segment 34 by a rail segment 36. In some instances, the linear component 26 may comprise a plastic material.

The upper segment 33 defines a rectangular shape that is substantially planar. The upper segment 33 includes a coupling feature 38 and spacer features 40. The coupling feature 38 extends away from a top surface 42 of the upper segment 33. The coupling feature 38 comprises a cylindrical portion 44 and a pair of locking wings 46. The cylindrical portion 44 extends upwardly, away from the top surface 42 of the upper segment 33. The pair of locking wings 46 are disposed on opposite sides of the cylindrical portion 44, proximate a top end 48 of the cylindrical portion 44. Each locking wing 46 of the pair of locking wings 46 includes an angled surface 50 configured to pull the top surface 42 of the linear component 26 into contact with the first element 10 (or to any other desired element), as will be described below.

The spacer features 40 are disposed on both the top surface 42 and a bottom surface 52 (shown in FIG. 7) of the upper segment 33. The spacer features 40 are configured to provide tolerance control between the linear component 26, the base component 28, and the first element 10, while reducing the contacting surface area between the linear component 26, the base component 28, and the first element 10. Reducing the contacting surface area between the various components and elements may reduce the friction between the various components and elements while assembling and disassembling the latching assembly 24. In some instances, the spacer features 40 may additionally prevent binding between the linear component 26, the base component 28, and the first element 10.

The lower segment 34 similarly defines a rectangular shape that is substantially planar. The lower segment 34 is arranged substantially parallel to the upper segment 33, spaced from the upper segment 33 by the rail segment 36. As illustrated, the lower segment 34 may extend laterally outward from the rail segment 36, perpendicular to an insertion axis 53 of the linear component 26, such that the lower segment 34 is laterally wider than the rail segment 36. The lower segment 34 similarly includes spacer features 40 on a bottom surface 54 of the lower segment 34 (shown in FIG. 6A).

As best illustrated in FIG. 6B, each of the upper segment 33 and the lower segment 34 includes a chamfer 55 at an insertion end 56 of the linear component 26. The chamfers 55 of the upper segment 33 and the lower segment 34 are angled away from each other. As such, the chamfers 55 are collectively configured to provide additional clearance between the upper segment 33 and the lower segment 34 at the insertion end 56 of the linear component 26.

Referring now to FIG. 7, the rail segment 36 extends in a generally linear direction from a trailing end 60 of the linear component 26 to the insertion end 56 of the linear component 26. The rail segment 36 defines a generally U-shaped, elongated channel having an open end 62 and a closed end 64 with sidewalls 66 extending therebetween. The open end 62 is disposed at the trailing end 60 of the linear component 26. The closed end 64 is disposed at the insertion end 56 of the linear component 26. The closed end 64 includes angled walls 67 that are angled inward toward each other, such that the closed end 64 has a smaller width than a remainder of the rail segment 36.

The sidewalls 66 include retention projections 68 disposed on outer surfaces of the sidewalls 66. The retention projections 68 are configured to engage the base component 28 when the rail segment 36 is received within the channel 32 of the base component 28, as will be described below.

It will be appreciated that, although the illustrated rail segment 36 defines a generally U-shaped, elongated channel, in some instances, the rail segment 36 may be a solid segment extending from the trailing end 60 of the linear component 26 to the insertion end 56 of the linear component 26. For example, in some instances, the rail segment 36 may only be hollow (i.e., U-shaped) to reduce material usage during fabrication.

Referring now to FIGS. 8A-8D, the base component 28 includes a body segment 69 having the channel 32, gripping features 70, a coupling feature 71, and a locking feature 72. In some instances, the base component 28 may comprise a plastic material.

The channel 32 extends along an insertion axis 73 (shown in FIG. 5) of the base component 28, throughout the body segment 69 of the base component 28. The channel 32 includes a rail receiving portion 75 and a lower segment receiving portion 76 (each shown in FIG. 8C). The rail receiving portion 75 is sized to receive the rail segment 36 of the linear component 26, while preventing the lower segment 30 from passing therethrough. The lower segment receiving portion 76 is sized to receive the lower segment 34 of the linear component 26. Because the lower segment 34 may not pass through the rail receiving portion 75, when the linear component 26 is inserted into the channel 32, the rail receiving portion 75 prevents the linear component 26 from being removed vertically (i.e., perpendicular to the insertion axis 73).

Figure 8C:
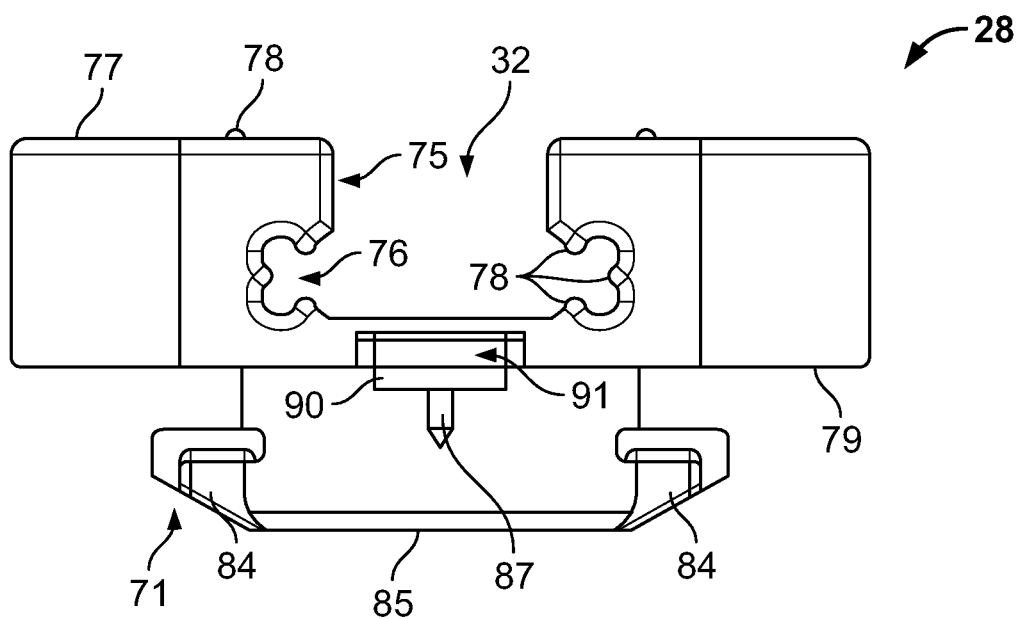
FIG. 8C is a front elevational view of the base component of FIG. 4.

As best illustrated in FIG. 8C, the lower segment receiving portion 76 and a top surface 77 of the body segment 69 include spacer features 78, similar to the spacer features 40 of the linear component 26. Each of the spacer features 78 extends across the base component 28, parallel to the insertion axis 73.

The spacer features 78 are similarly configured to provide tolerance control between the linear component 26, the base component 28, and the second element 12, while reducing the contacting surface area and preventing binding between the linear component 26, the base component 28, and the second element 12.

The channel 32 additionally includes two pairs of opposed chamfers 80 (one being shown in FIG. 8A and another being shown in FIG. 9) and a plurality of retention features 81. The pairs of opposed chamfers 80 are disposed at the insertion end 82 of the base component 28. The pairs of opposed chamfers 80 are configured to provide additional clearance for the insertion of the rail segment 36 into the channel 32. The plurality of retention features 81 are configured to engage the retention projections 68 of the rail segment 36 when the rail segment 36 is received in the channel 32, thereby retaining the linear component 26 in engagement with the base component 28.

Figure 10:
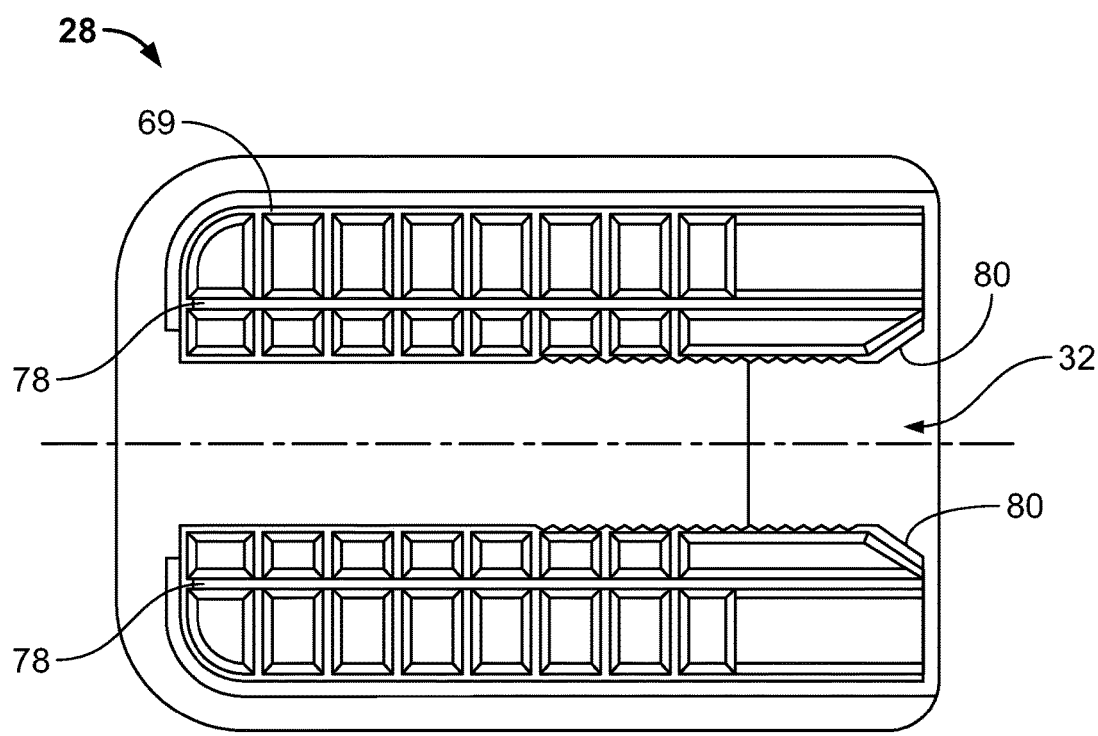
FIG. 10 is a top plan view of the base component of FIG. 4, shown without gripping portions.

As best illustrated in FIG. 8A, the gripping features 70 are disposed on opposite sides of the body segment 69. The gripping features 70 comprise curved surfaces configured to aid in the movement of the base component 28 during assembly of the latching assembly 24. However, in some instances, the base component 28 may not include the gripping features 70 (shown in FIG. 10).

Referring to FIG. 8B, the coupling feature 71 extends downward, away from a bottom surface 79 of the body segment 69. Similar to the coupling feature 38, the coupling feature 71 includes a cylindrical portion 83 and a pair of locking wings 84. The cylindrical portion 83 extends downwardly, away from the bottom surface 79 of the body segment. The pair of locking wings 84 are disposed on opposite sides of the cylindrical portion 83, proximate a bottom end 85 of the cylindrical portion 83.

As best shown in FIG. 8B, each locking wing 84 of the pair of locking wings 84 includes an angled surface 86 configured to aid in coupling the base component 28 to the second element 12 (or any other desired element), as will be described below. Additionally, the cylindrical portion 83 may include spacer features 87, similar to the spacer features 40, 78, described above. The spacer features 87 are disposed on an outer surface 88 of the cylindrical portion 83 and extend along an axial direction of the cylindrical portion 83 away from the bottom surface 79 of the body segment 69.

Figure 8D:
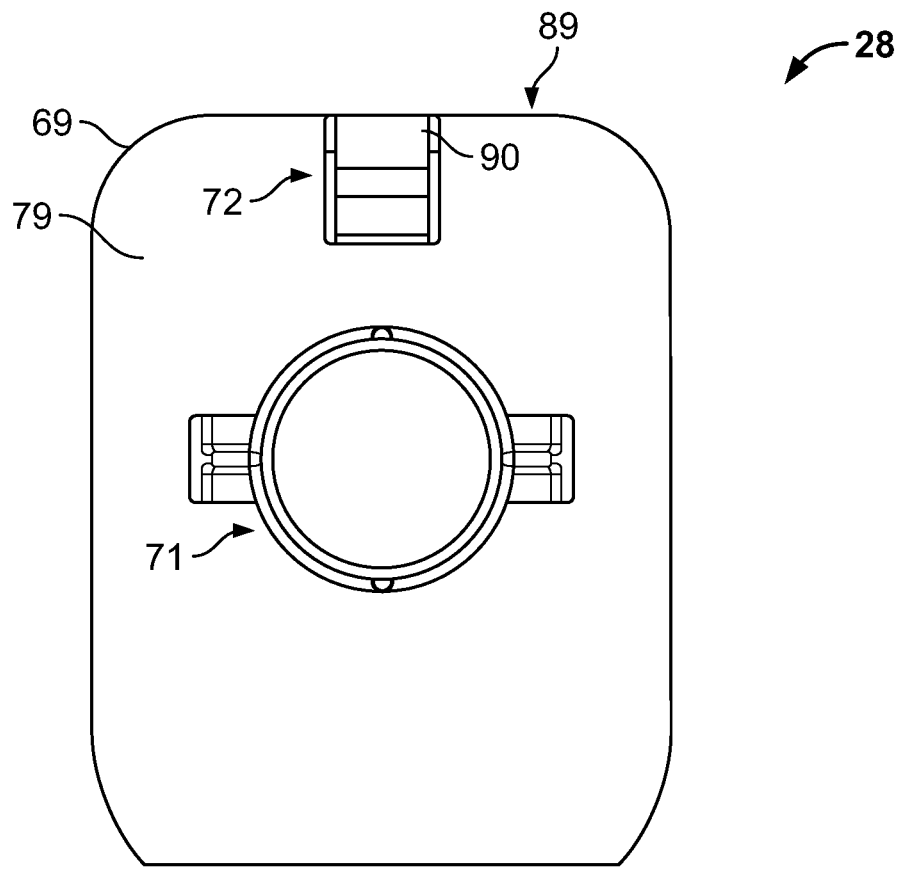
FIG. 8D is a bottom plan view of the base component of FIG. 4.
Figure 9:
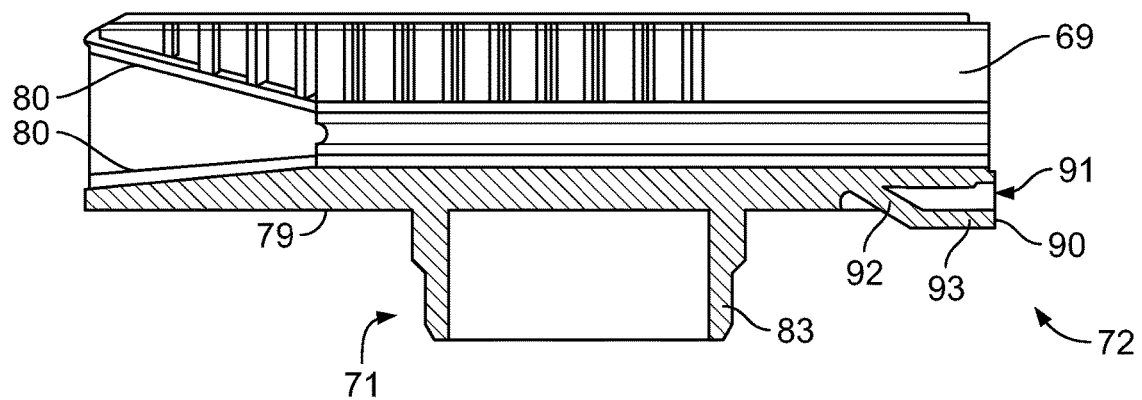
FIG. 9 is a cross-sectional view of the base component of FIG. 8A, taken along line 9-9.

As best illustrated in FIGS. 8D and 9, in some instances, the locking feature 72 may be disposed on the bottom surface 79 of the body segment 69 at a trailing end 89 of the body segment 69. The locking feature 72 may include a locking tab 90 and a recess 91. The locking tab 90 may include an angled portion 92 and a locking portion 93 (shown in FIG. 9). The angled portion 92 may extend at an angle away from the bottom surface 79 of the body segment 69. The locking portion 93 may extend from the angled portion 92, parallel to the bottom surface 79 of the body segment 69. The recess 91 may be recessed into the bottom surface 79 of the body segment 69. The recess 91 may be arranged such that it provides clearance for the locking tab 90 to flex inward, into the recess 91, when a force is applied to the locking tab 90.

Referring now to FIGS. 11-15, the base component 28 is shown being coupled to a corresponding mating panel 100. The mating panel 100 is configured to receive and engage both the coupling feature 71 and the locking feature 72 of the base component 28. In some instances, the mating panel 100 may be coupled to or implemented into the second element 12 described above to allow for coupling using the latching assembly 24. In other instances, the mating panel 100 may be coupled to or implemented into various other elements to allow for coupling using the latching assembly 24.

The mating panel 100 includes a coupling aperture 102 and a locking aperture 104. The coupling aperture 102 is configured to receive the coupling feature 71 of the base component 28. Accordingly the coupling aperture 102 includes a cylindrical receiving portion 106 and a pair of opposed wing-receiving portions 108. The locking aperture 104 is configured to receive the locking tab 90 of the locking feature 72 of the base component 28.

Figure 11:
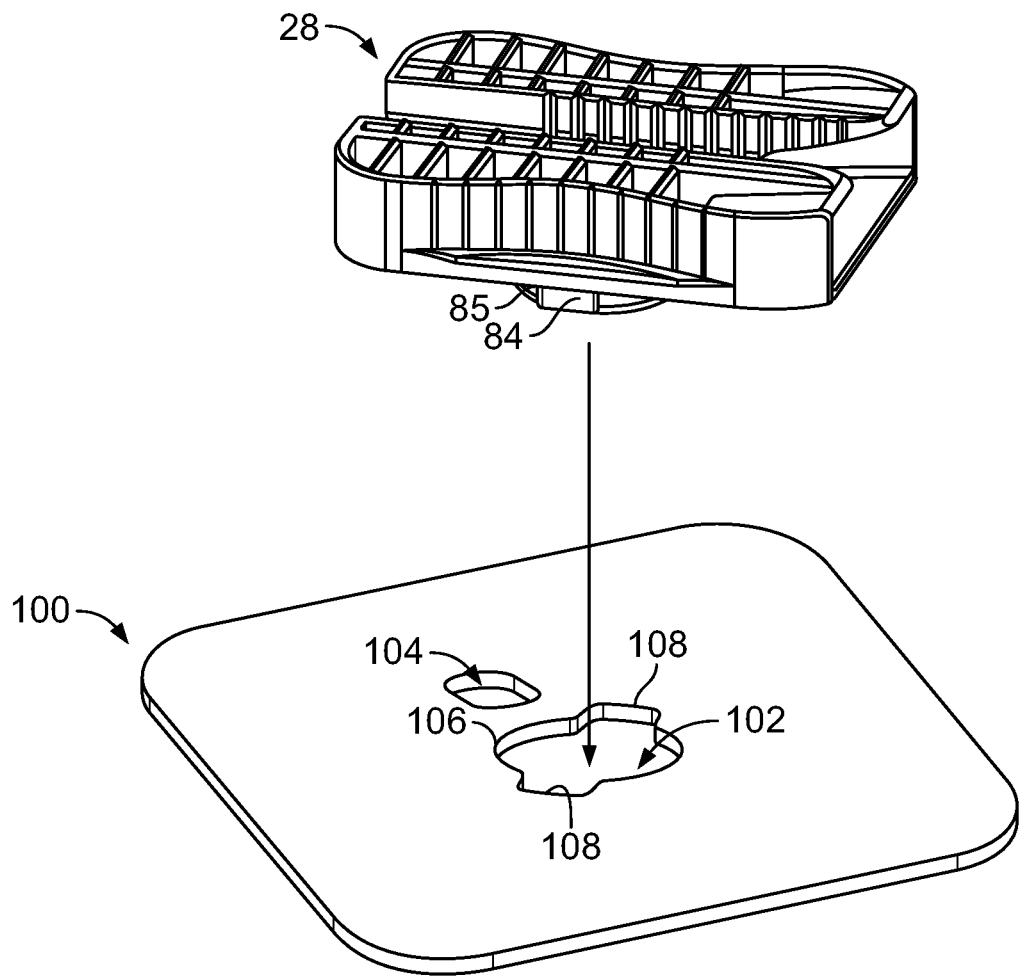
FIG. 11 is a perspective view of the base component of the latching assembly of FIG. 4, shown detached from a mating panel, in accordance with aspects of the present disclosure.
Figure 12:
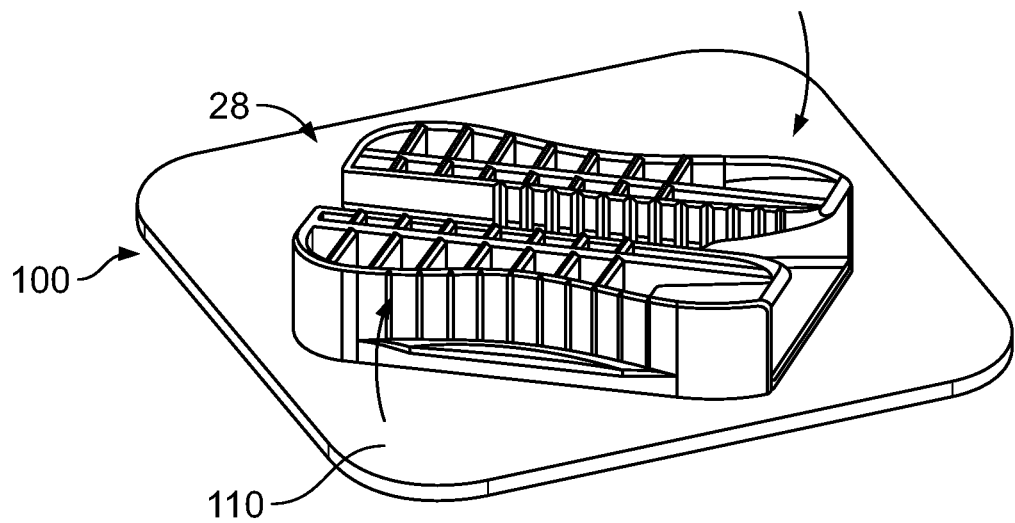
FIG. 12 is a perspective view of the base component and mating panel of FIG. 11, shown in an unlocked configuration.
Figure 13:
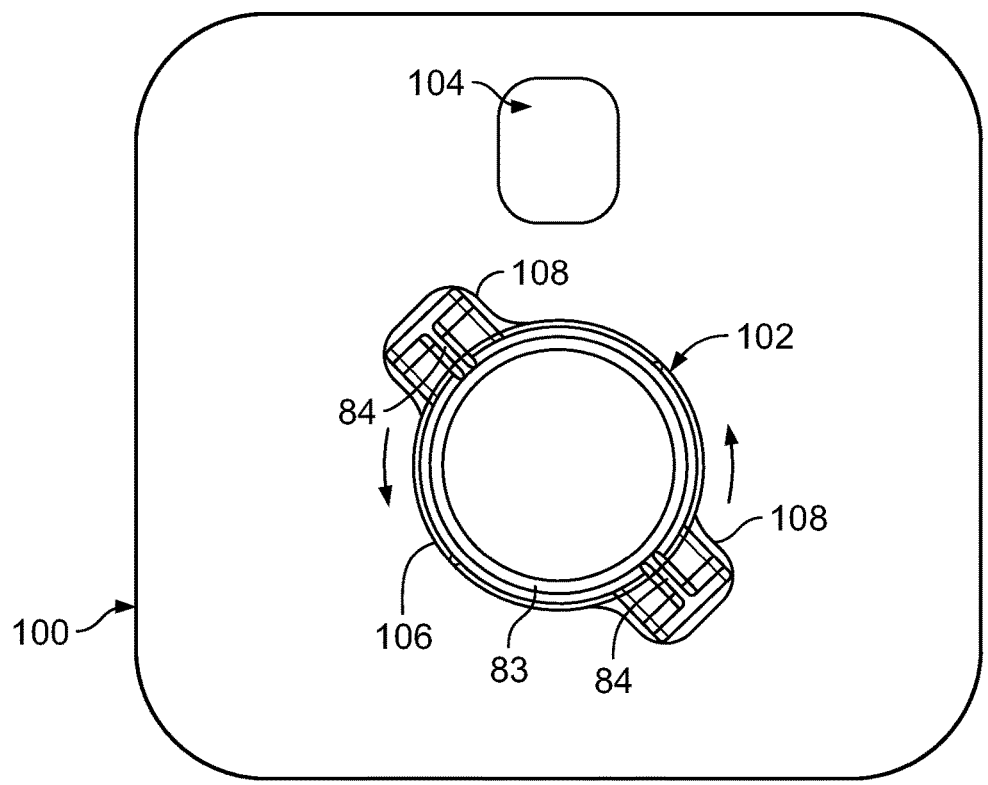
FIG. 13 is a bottom plan view of the base component and mating panel of FIG. 12, shown in the unlocked configuration.

During use, the coupling feature 71 of the base component 28 may first be aligned with the coupling aperture 102 of the mating panel 100. Specifically, the locking wings 84 of the coupling feature 71 may be aligned with the wing-receiving portions 108 of the coupling aperture 102, as shown in FIG. 11. With the coupling feature 71 aligned with the coupling aperture 102, the coupling feature 71 may be inserted into the coupling aperture 102, as shown in FIGS. 12 and 13.

Figure 14:
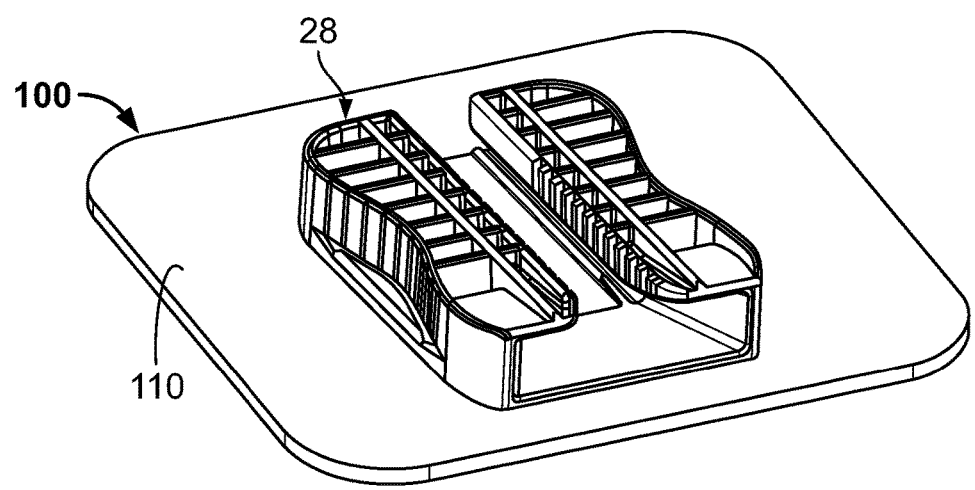
FIG. 14 is a perspective view of the base component and mating panel of FIG. 11, shown in a locked configuration.
Figure 15:
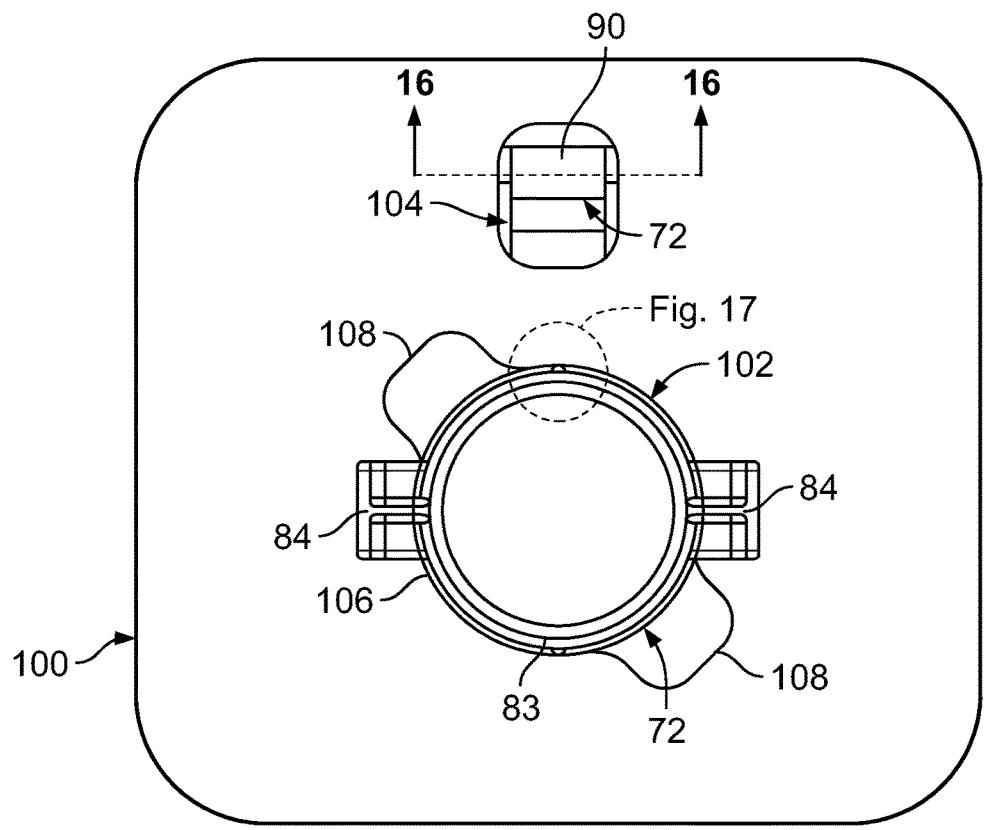
FIG. 15 is a bottom plan view of the base component and mating panel of FIG. 14, shown in the locked configuration.

With the coupling feature 71 inserted into the coupling aperture 102, the base component 28 may be rotated, with respect to the mating panel 100, to couple the base component 28 to the mating panel 100, as shown in FIGS. 14 and 15. Specifically, as the base component 28 is rotated, the angled surfaces 86 come into contact with the mating panel 100, thereby pulling the mating panel 100 toward the base component 28.

As the mating panel 100 is pulled toward the base component 28, a top surface 110 of the mating panel 100 is pulled into contact with the bottom surface 79 of the body segment 69 of the base component 28. This contact between the top surface 110 of the mating panel 100 and the bottom surface 79 of the body segment 69 provides static friction between the mating panel 100 and the base component 28, thereby inhibiting the base component 28 from rotating with respect to the mating panel 100. As such, the coupling feature 71 of the base component 28 is inhibited from rotating back into alignment with the coupling aperture 102. Accordingly, the base component 28 is retained in engagement with the mating panel 100.

Figure 16:
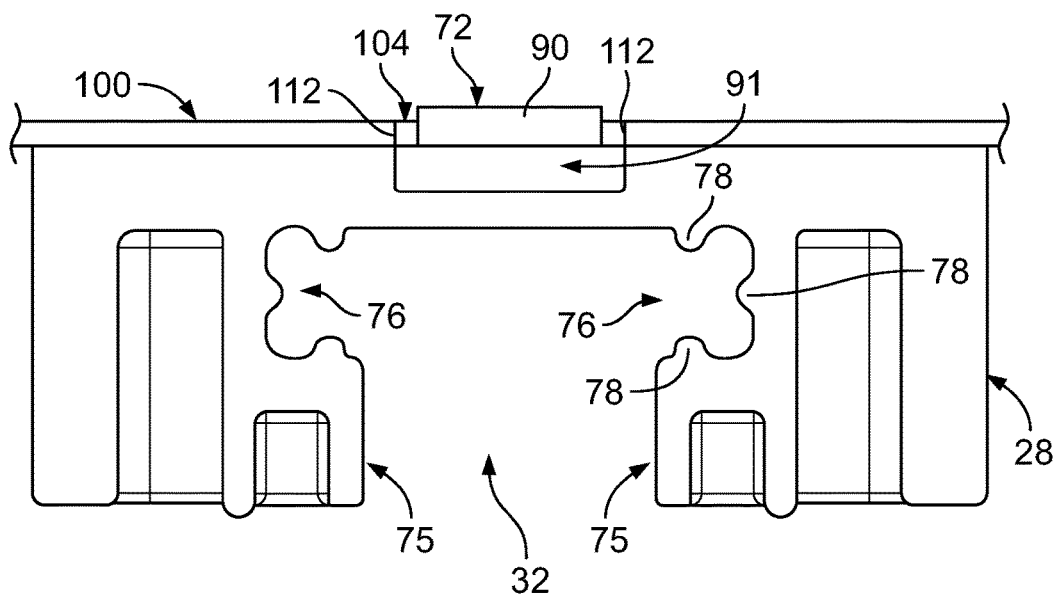
FIG. 16 is a partial cross-sectional view of the base component and mating panel of FIG. 15, taken along line 16-16.

Additionally, the locking feature 72 of the base component 28 is configured to engage the locking aperture 104 of the mating panel 100 to lock the base component 28 in engagement with the mating panel 100. Specifically, as the top surface 110 of the mating panel 100 is pulled into contact with the bottom surface 79 of the body segment 69 of the base component 28, the locking tab 90 of the locking feature 72 is pushed or flexed into the recess 91 of the locking feature 72. The base component 28 may then be rotated until the locking tab 90 is aligned with the locking aperture 104 of the mating panel 100. With the locking tab 90 aligned with the locking aperture 104, the locking tab 90 is allowed to return to an initial non-flexed position, such that it is at least partially disposed within the locking aperture 104, as shown in FIG. 16.

With the locking tab 90 disposed within the locking aperture 104, the locking tab 90 is configured to contact edges 112 of the locking aperture 104 when the base component 28 is rotated with respect to the mating panel 100. As such, the base component 28 is prevented from rotating out of engagement with the mating panel 100.

To disengage the base component 28 from the mating panel 100, the locking tab 90 may be pushed or flexed into the recess 91, such that the locking tab 90 is removed from the locking aperture 104. As such, the locking tab 90 no longer prevents rotation of the base component 28 with respect to the mating panel 100. Thus, the base component 28 may be rotated such that coupling feature 71 of the base component 28 is again aligned with the coupling aperture 102 of the mating panel 100, as described above. The base component 28 may then be removed from the mating panel 100.

Figure 17:
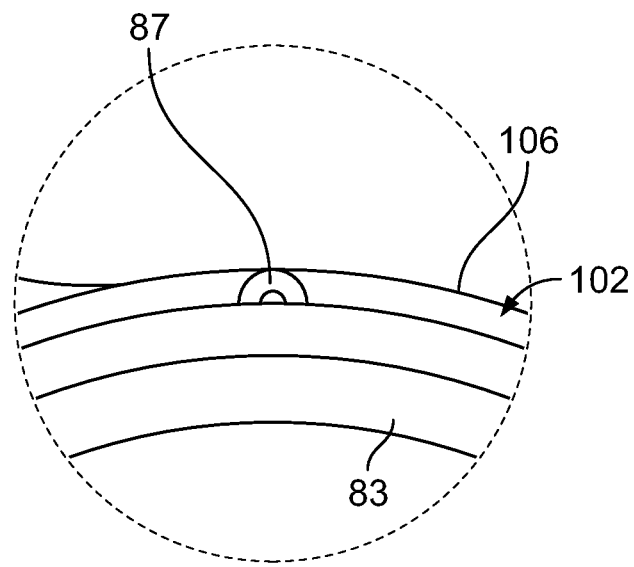
FIG. 17 is a detail view of the base component and mating panel of FIG. 15, taken along line 17-17.

As shown in FIG. 17, the spacer features 87 on the cylindrical portion 83 of the coupling feature 71 may be configured to contact surfaces defining the cylindrical receiving portion 106 of the coupling aperture 102 when the coupling feature 71 is inserted into the coupling aperture 102. Accordingly, the spacer features 87 may be configured to provide tolerance control between the cylindrical portion 83 of the coupling feature 71 and the cylindrical receiving portion of the coupling aperture 102.

It may be appreciated that the coupling feature 38 of the linear component 26 is substantially similar to the coupling feature 71 of the base component 28. As such, the linear component 26 may be coupled to a mating panel substantially similar to the mating panel 100 described above, which may similarly be integrated into any desirable element or component to be coupled to another other desirable element or component using the latching assembly 24.

It may also be appreciated that, although the illustrated linear component 26 does not include a locking feature, in some instances the linear component 26 may additionally include a locking feature, similar to the locking feature 72 described above, to selectively lock the linear component 26 in engagement with the corresponding mating panel, as desired for a given application.

Figure 18:
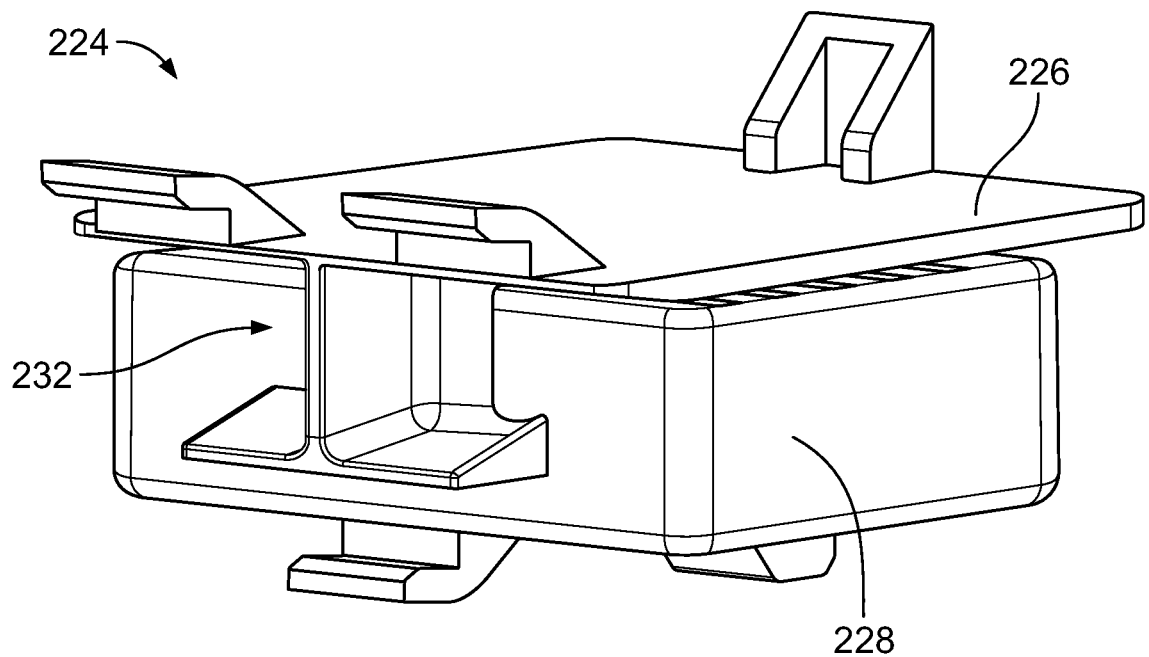
FIG. 18 is a perspective view of another latching assembly, in accordance with aspects of the present disclosure.

Referring now to FIG. 18, another latching assembly 224 is illustrated. The latching assembly 224 is substantially similar to the latching assembly 24, described above. As such, like elements will be numbered similarly in the 200 series (e.g., linear component 26 and linear component 226, base component 28 and base component 228, channel 32 and channel 232, etc.). The description below will focus on the differences between the latching assembly 224 and the latching assembly 24 described above.

Figure 19C:
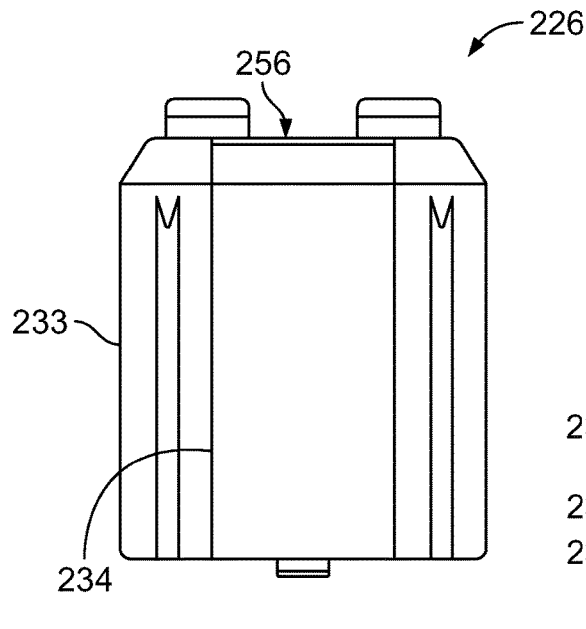
FIG. 19C is a front elevational view of the linear component of the latching assembly of FIG. 18.
Figure 19C:
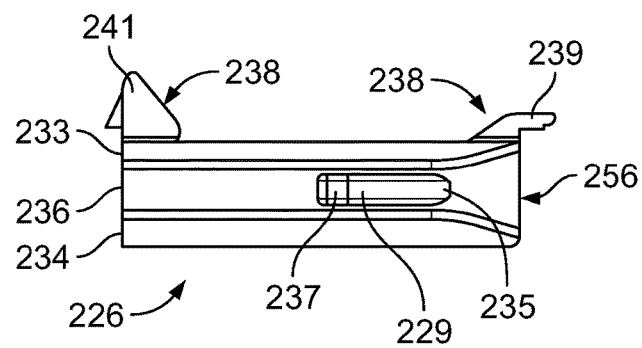
Figure 19C:
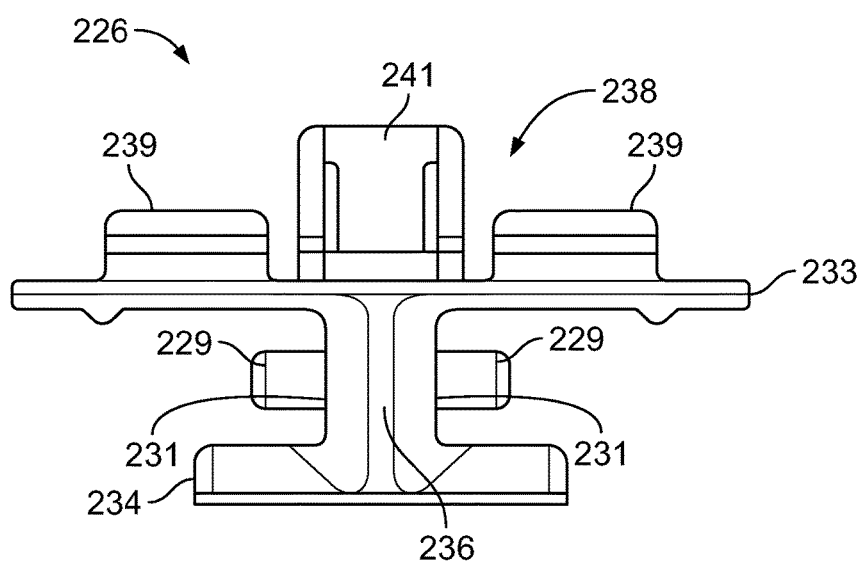

As shown in FIGS. 19A-19C, the linear component 226 has a rail segment 236 and a coupling feature 238 that are different than the rail segment 36 and the coupling feature 38 of the linear component 26 of the latching assembly 24.

For example, the rail segment 236 includes a pair of transverse extensions 229. The pair of transverse extensions 229 extend outwardly from opposing lateral sides 231 of the rail segment 236 proximate an insertion end 256 of the linear component 226. Each of the transverse extensions 229 includes a rounded end 235 and a retention projection 237. The rounded end 235 is disposed toward the insertion end 256 of the linear component 226. The rounded end 235 provides additional clearance when inserting the rail segment 236 into a channel 232 of the base component 228. The retention projection 237 may be configured to engage at least one of a plurality of retention features 281 of the base component 228 (see FIG. 20A), which may be similar to the retention features 81 of the base component 28.

With reference again to FIGS. 19A-19C, the coupling feature 238 of the linear component 226 is configured to couple the rail segment 236 to an external element, similar to the first element 10 described above. The coupling feature 238 includes insertion tabs 239 and a snap element 241. The insertion tabs 239 and the snap element 241 of the coupling feature 238 are configured to engage a mating panel 300, as will be described below.

Figure 20A:
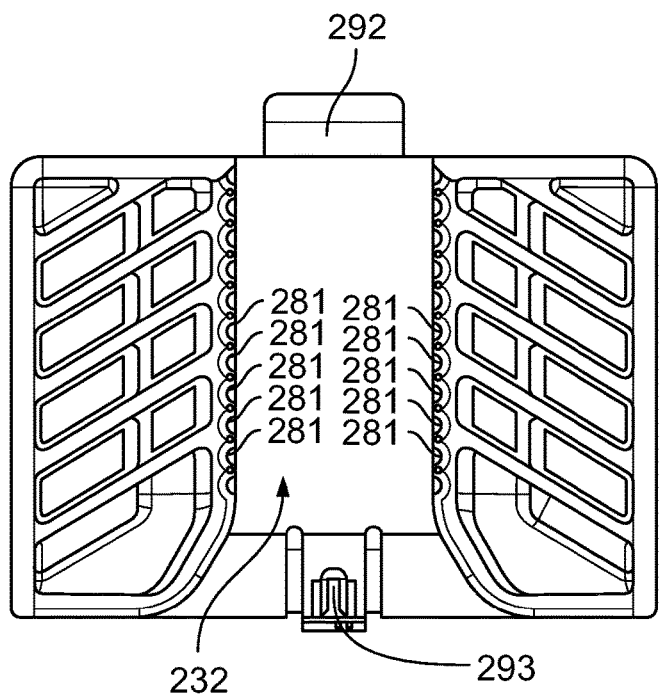
FIG. 20A is a top plan view of a base component of the latching assembly of FIG. 18.
Figure 20B:
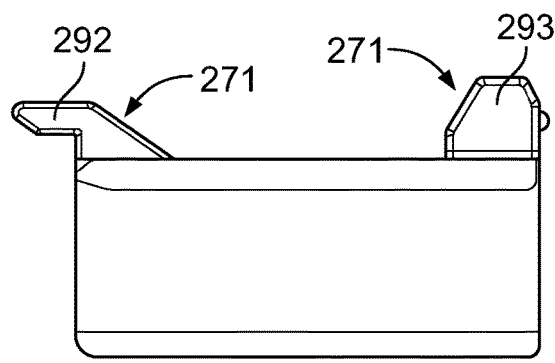
FIG. 20B is a side elevational view of the base component of the latching assembly of FIG. 18.
Figure 20C:
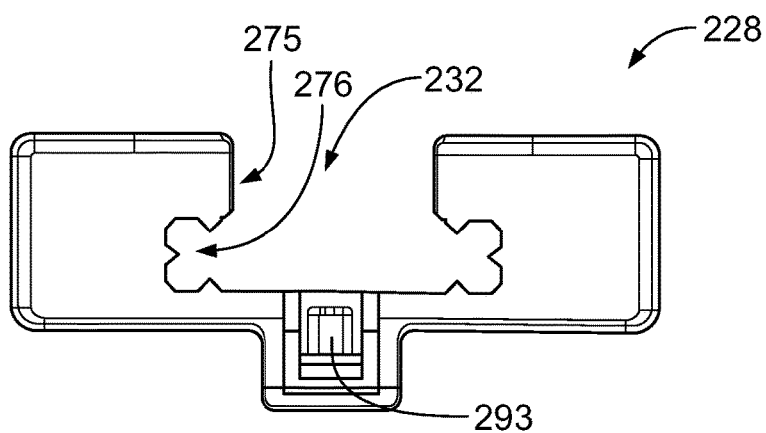
FIG. 20C is a front elevational view of the base component of the latching assembly of FIG. 18.

Referring now to FIGS. 20A-20C, a base component 228 of the latching assembly 224 includes a coupling feature 271 that is different than the coupling feature 71 of the latching assembly 24. The coupling feature 271 of the base component 228 is similar to the coupling feature 238 of the linear component 226. The coupling feature 271 includes an insertion tab 292 and a snap element 293 that are collectively configured to engage a mating panel 400, as will be described below.

Figure 21:
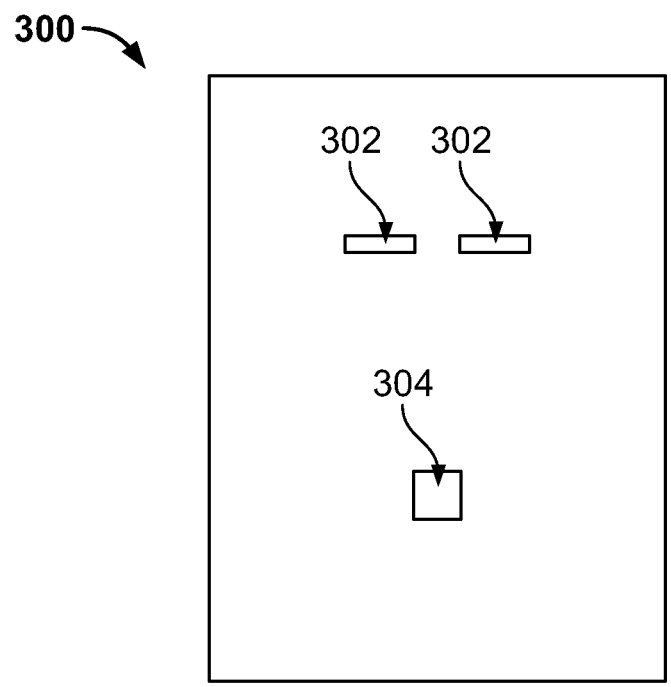
FIG. 21 is a top plan view of a mating panel, in accordance with aspects of the present disclosure.

Referring now to FIG. 21, the mating panel 300 includes tab apertures 302 and a snap element aperture 304. The tab apertures 302 are configured to receive and engage the insertion tabs 239 of the coupling feature 238. The snap element aperture 304 is similarly configured to receive and engage the snap element 241 of the coupling feature 238. In some instances, the mating panel 300 may be coupled to or implemented into an external element, such as, for example, the first element 10 described above, to allow for coupling using the latching assembly 200.

During use, the insertion tabs 239 of the coupling feature 238 may first be inserted into the tab apertures 302 of the mating panel 300. The snap element 241 may then be inserted into the snap element aperture 304. The mating panel 300 is sized such that, subsequent to the insertion tabs 239 being inserted into the tab apertures 302, the snap element 241 will come into contact with an edge defining a portion of the snap element aperture 304 and flex inward as the snap element 241 is inserted into the snap element aperture 304. Once the snap element 241 is fully inserted into the snap element aperture 304, the snap element 241 is allowed to flex back outward, thereby locking the snap element 241 within the snap element aperture 304. Further, with the insertion tabs 239 inserted into the tab apertures 302, when the snap element 241 is inserted into the snap element aperture 304, a portion of each of the insertion tabs 239 is rotated under the mating panel 300. With the insertion tabs 239 inserted into the tab apertures 302, and the snap element locked within the snap element aperture 304, the linear component 226 is fixedly coupled to the mating panel 300.

Figure 22:
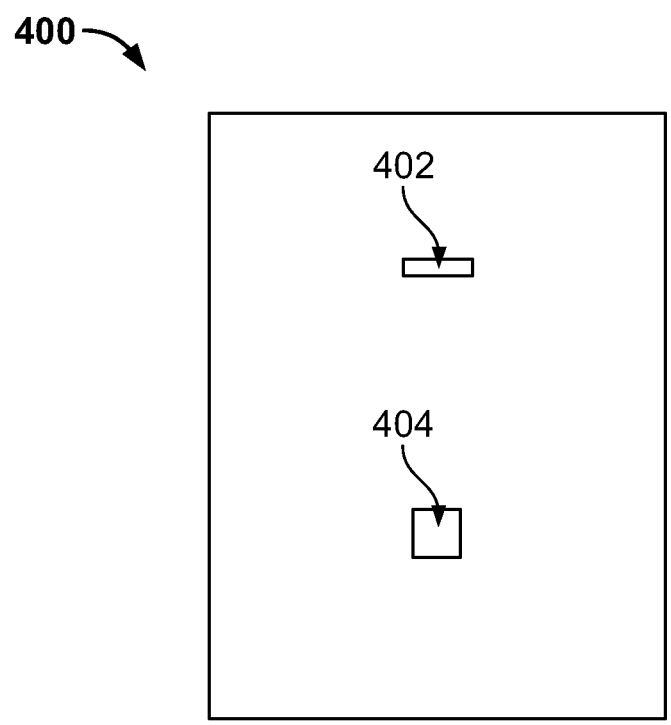
FIG. 22 is a top plan view of a mating panel, in accordance with aspects of the present disclosure.

As shown in FIG. 22, the mating panel 400 is substantially similar to the mating panel 300. However, the mating panel 400 includes a single, centered tab aperture 402 to correspond to the single insertion tab 292 of the base component 228. Accordingly, the base component 228 may be similarly coupled to the mating panel 400, as described above, with reference to the linear component 226 and the mating panel 300.

As such, described herein are various latching assemblies that are configured to quickly, easily, efficiently, and effectively secure various components together. The various latching assemblies may be selectively coupled and decoupled from various components, allowing for the latching assemblies to be serviced and reused without compromising performance.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention.

All of the publications described herein, including patents and non-patent publications are hereby incorporated herein by reference in their entireties.

I claim:

1. A latching assembly configured to couple a first element to a second element, the latching assembly comprising:
    a linear component configured to be coupled to a first element, the linear component including an upper segment, a lower segment, and at least one retention projection; and
    a base component configured to be coupled to a second element, the base component including a channel extending along an insertion axis and at least one retention feature, wherein the base component further includes a coupling feature configured to couple the base component to the second element and a locking feature configured to lock the base component in engagement with the second element, wherein the locking feature of the base component comprises a locking tab,
    wherein the lower segment of the linear component is configured to be slidably received along the insertion axis and within the channel of the base component and the at least one retention feature of the base component is configured to engage the at least one retention projection of the linear component to retain the linear component within the channel of the base component, wherein a coupling feature of the linear component extends away from the upper segment in a direction that is perpendicular to the insertion axis.

2. The latching assembly of claim 1, wherein the upper segment of the linear component further includes a top surface and the coupling feature extends away from the top surface and is configured to couple the linear component to the first element.

3. The latching assembly of claim 2, wherein the coupling feature includes a cylindrical portion and a pair of locking wings.

4. The latching assembly of claim 3, wherein each locking wing of the pair of locking wings includes an angled surface configured to pull the linear component into contact with the first element.

5. The latching assembly of claim 1, wherein each locking wing of the pair of locking wings includes an angled surface configured to pull the base component into contact with the second element.

6. The latching assembly of claim 1, wherein at least one of the linear component and the base component includes a chamfer at an insertion end configured to provide additional clearance when inserting the linear component into the base component.

7. The latching assembly of claim 1, wherein the linear component further includes a rail segment, and the channel of the base component includes a rail receiving portion and a lower segment receiving portion, the rail receiving portion being configured to receive the rail segment of the linear component and the lower segment receiving portion being configured to receive the lower segment of the linear component.

8. The latching assembly of claim 7, wherein when the linear component is received within the channel of the base component, the rail receiving portion is configured to prevent the linear component from being removed from the channel perpendicular to the insertion axis of the base component.

9. The latching assembly of claim 1, wherein at least one of the linear component and the base component includes a spacer feature configured to reduce friction between the linear component and the base component when the linear component is inserted into the base component.

10. A latching assembly configured to couple a first element to a second element, the latching assembly comprising:
    a linear component configured to be coupled to a first element, the linear component including an upper segment and a rail segment; and
    a base component configured to be coupled to a second element, the base component including a channel extending along an insertion axis, wherein the base component further includes a coupling feature configured to couple the base component to the second element, wherein the coupling feature of the base component includes a cylindrical portion and a pair of locking wings,
wherein the rail segment of the linear component is configured to be slidably received along the insertion axis and retained within the channel of the base component, and
wherein a coupling feature of the linear component extends away from the upper segment in a direction that is perpendicular to the insertion axis.

11. The latching assembly of claim 10, wherein the linear component includes at least one retention projection, the base component includes at least one retention feature, and wherein the at least one retention feature of the base component is configured to engage the at least one retention projection of the linear component to retain the linear component within the channel of the base component.

12. The latching assembly of claim 10, wherein the base component further includes a coupling feature configured to couple the base component to the second element.

13. The latching assembly of claim 12, wherein the coupling feature of the base component includes at least one insertion tab and a snap feature.

14. The latching assembly of claim 12, wherein the coupling feature of the base component includes a cylindrical portion and a pair of locking wings.

15. The latching assembly of claim 14, wherein each locking wing of the pair of locking wings includes an angled surface configured to pull at least one of the linear component and the base component into contact with the one of the first element and the second element.

16. The latching assembly of claim 10, wherein at least one of the linear component and the base component includes a spacer feature configured to reduce friction between the linear component and the base component when the linear component is inserted into the base component.

* * * * *